United States Patent
Pangrazio, III

(10) Patent No.: US 8,643,879 B2
(45) Date of Patent: Feb. 4, 2014

(54) HOSTED PRINT JOB TICKET CONVERSION

(75) Inventor: Donald M. Pangrazio, III, LeRoy, NY (US)

(73) Assignee: Xerox Corporation, Norwalk, CT (US)

( * ) Notice: Subject to any disclaimer, the term of this patent is extended or adjusted under 35 U.S.C. 154(b) by 560 days.

(21) Appl. No.: 12/905,259

(22) Filed: Oct. 15, 2010

(65) Prior Publication Data

US 2012/0092688 A1    Apr. 19, 2012

(51) Int. Cl.
*G06F 3/12* (2006.01)

(52) U.S. Cl.
USPC .................................................. 358/1.15

(58) Field of Classification Search
USPC .................................................. 358/1.15
See application file for complete search history.

(56) References Cited

U.S. PATENT DOCUMENTS

| | | |
|---|---|---|
| 6,032,004 A | 2/2000 | Mirabella, Jr. et al. |
| 6,431,772 B1 | 8/2002 | Melo et al. |
| 2001/0043365 A1 | 11/2001 | Kremer et al. |
| 2005/0179921 A1 | 8/2005 | Brossman et al. |
| 2007/0127064 A1 | 6/2007 | Kuroshima |
| 2008/0151284 A1 | 6/2008 | Morales et al. |
| 2008/0180728 A1 | 7/2008 | Sekine |
| 2010/0188680 A1* | 7/2010 | Xiao ............................. 358/1.13 |
| 2010/0225966 A1* | 9/2010 | Bailey et al. ................. 358/1.15 |

FOREIGN PATENT DOCUMENTS

JP    2006065839    3/2006

* cited by examiner

*Primary Examiner* — Marivelisse Santiago Cordero
*Assistant Examiner* — Mesfin Getaneh
(74) *Attorney, Agent, or Firm* — Gibb & Riley, LLC

(57) ABSTRACT

A computerized device receives a print job from a printing device. The computerized device is operatively connected to the printing device and to a plurality of different printing devices through a computerized network. Further, the print job has one of many file formats and one of many ticketing types. If the file format and/or the ticketing type of the print job do not match one of many acceptable format types and acceptable ticketing types acceptable to the printing device, the computerized device converts the file format and/or the ticketing type of the print job into one of the acceptable format types and/or the acceptable ticketing types to produce a converted print job. The computerized device sends the converted print job to the printing device over the computerized network to allow the printing device to print the converted print job.

20 Claims, 5 Drawing Sheets

HOSTED PRINT JOB TICKET CONVERSION

BACKGROUND

Embodiments herein generally relate to print job ticket conversion and more particularly to a hosted service for print job ticket conversion that obviates the need for expensive local digital front-end processing job ticket conversions.

With the emergence of cloud computing and hosted applications for user authentication and file repository access, printers such as multifunction printers can offer up files (titles) from any location to be printed at a local device. The hosted applications will be responsible for submitting acceptable file formats (such as portable document format (PDF), etc.) along with the appropriate job ticketing types (such as extended processed image file (XPIF), printer working group (PWG), printer job language (PJL), etc).

An application which focuses on driving a certain class of printer that supports one specific ticketing format will not be able to easily provide support to another class of printer that supports a different ticketing format or a variant of the ticketing format. The application may need a sizeable development effort to add support for the different format. This is a common source of problems in the field, such that one cannot easily substitute one printer model with another. This can stifle desired upgrade plans, confuse the sales force and frustrate customers.

SUMMARY

In one exemplary method embodiment herein, a printing device receives a print job to be printed. The print job has one of a plurality of file formats and one of a plurality of ticketing types. The printing device supports one or more of a plurality of file formats and one or more of a plurality of ticketing types. With the embodiments herein, the print files can be selectively routed to the hosted service for possible conversion (server side determination, i.e., as determined by the web service) to a supported format and ticketing combination before the job is released for processing. The process for printer side selection of which print files are routed to the web service can be configured to be a combination of the sender, creator, application/driver, device submitting, all jobs, etc. In another scenario (printer side determination of what gets converted), the printing device compares a file format and a ticketing type of the print job with acceptable file format types and acceptable ticketing types that are acceptable to the printing device. Therefore, with embodiments herein, either the printer or the web service (or a combination of the two) can determine whether the file format and/or ticketing type are correct. For example, the printer can perform the full comparison itself, or the printer can perform no comparison (can just automatically send all potential print jobs to the web service). In other embodiments, the printer can perform a preliminary comparison that is based on what device sent the print job to the printer, what device created the print job, what application or driver was used to create the print job, etc. Based on this preliminary comparison, the printer can determine whether to send the print job to the web service to have the web service perform a more complete and more sophisticated comparison to determine whether the print job contains an acceptable file format and ticketing type for the individual printer. If the file format and the ticketing type of the print job match the acceptable format types and the acceptable ticketing types, the method prints the print job using the printing device However, if the file format and/or the ticketing type of the print job does not match the acceptable format types and/or the acceptable ticketing types, the method passes the print job to the web service (if it has not already done so) which performs a conversion and printing method. In this conversion and printing method, the printing device sends the print job to a computerized device operatively connected to (directly or indirectly connected to) the printing device through a computerized network. The computerized device is operatively connected to a plurality of different printing devices in addition to the printing device. The computerized device converts the file format and/or the ticketing type of the print job into one of the acceptable format types and/or the acceptable ticketing types to produce a converted print job. In this conversion and printing method, the printing device receives the converted print job from the computerized device over the computerized network and the printing device prints the converted print job.

The file formats are dependent upon a software program used to create the document within the print job. Also, the ticketing types are dependent upon different hardware components and different software requirements of the different printing devices. For example, the ticketing types may be dependent upon potentially different raster image processors, different controllers, etc., of the different printing devices. The print job (or data stream) is a PDL file (for example PDF, Postscript, or PCL) with the jobticket information prefixed to the head of the file in the case of XPIF, PJL, PWG, or at the head and intermixed as is the case with some Postscript ticketing. While each print job will only contain a single document, multi-document print jobs could be utilized with embodiments herein. The computerized device is a component of a generic hosted service.

In another method embodiment herein, a computerized device receives the print job from the printing device. Again, the computerized device is operatively connected to the printing device and to a plurality of different printing devices through a computerized network. Further, the print job has one of many file formats and one of many ticketing types. In this embodiment, the printing device can indicate to the computerized device that either the file format and/or the ticketing type of the print job does not match one of many acceptable format types and acceptable ticketing types acceptable to the printing device. As mentioned above, either the printer or the web service (or a combination of the two) can determine whether the file format and/or ticketing type are correct. The computerized device converts the file format and/or the ticketing type of the print job into one of the acceptable format types and/or the acceptable ticketing types to produce a converted print job. The computerized device sends the converted print job to the printing device over the computerized network to allow the printing device to print the converted print job.

A further embodiment herein comprises a printing device that includes a processor, a marking device operatively connected to the processor, a media path positioned to supply sheets of media to the marking device, and a communications port operatively connected to the processor and to a computerized network external to the printing device. The communications port receives a print job to be printed. Again, the print job has one of many file formats and one of many ticketing types. The processor or the web service compares the file format and the ticketing type of the print job with acceptable file format types and acceptable ticketing types that are acceptable to the printing device. If the file format and the ticketing type of the print job match the acceptable format types and the acceptable ticketing types, the processor causes the print job to be printed on the sheets of media using the marking device.

However, if the file format and/or the ticketing type of the print job do not match the acceptable format types and the acceptable ticketing types. The processor causes the printing device to perform a conversion and printing process. In this conversion and printing process, the communications port sends the print job to a computerized device operatively connected to the communications port through the computerized network. Again, the computerized device is operatively connected to a plurality of different printing devices in addition to the printing device. The computerized device converts the file format and/or the ticketing type of the print job into one of the acceptable format types and the acceptable ticketing types to produce a converted print job. The communications port receives the converted print job from the computerized device over the computerized network and the marking device prints the converted print job on the sheets of media.

A further embodiment herein comprises a computerized device that includes a processor, and a communications port operatively connected to the processor and to a computerized network external to the computerized device. The computerized device is operatively connected to a printing device and to a plurality of different printing devices through the computerized network.

The communications port receives a print job from the printing device. Again, the print job has one of many file formats and one of many ticketing types. If the file format and/or the ticketing type of the print job do not match one of many acceptable format types and acceptable ticketing types acceptable to the printing device, the processor converts the file format and/or the ticketing type of the print job into one of the acceptable format types and the acceptable ticketing types to produce a converted print job. The communications port sends the converted print job to the printing device over the computerized network to allow the printing device to print the converted print job.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

As mentioned above, an application that has integrated with a certain printer device that supports one ticketing format will not be able to easily provide support to another class of printer that supports a different ticketing format or a variant of the ticketing format. The application may need a sizeable development effort to add support for the second printer format. This is a common source of problems in the field, such that one cannot easily substitute one printer model with another. This can stifle desired upgrade plans, confuse the sales force and frustrate customers.

In view of the foregoing, the embodiments herein provide a web/cloud hosted print job ticket "conversion" which allows print applications to avoid such ticket conversion investment. The solutions provided herein can be used to migrate jobs with different job ticket types from one competitive printing device to another. Thus, with embodiments herein, regardless of the device manufacturer, the hosted job ticket conversion method and system is a powerful tool when placing new devices.

More specifically, the embodiments herein provide a hosted job ticket conversion method and system that resolves job ticket differences between various printers with different controllers and raster image processors (RIPs). This enables the seamless swapping of printer devices that share access to the web/cloud hosted job ticket conversion services of embodiments herein.

In one example, once a user is authenticated, the user can use a web/cloud based hosted service via the user interface of the printing device, and browse for titles (documents) for direct printing on the printing device. The hosted "print" applications will be responsible for submitting acceptable file formats (such as PDF) along with the appropriate job ticketing (such as XPIF, PWG, PJL, etc). However, an application which has been integrated with a certain printer device that supports one ticketing format will not be able to easily provide support to another class of printer that supports a different ticketing format or a variant of the ticketing format. The application may need a sizeable development effort to add support for the second format. To avoid this development effort, the job ticket conversion embodiments herein convert one job ticket type to another job ticket type and thereby support a second class of printer (or model type).

Figure 1:
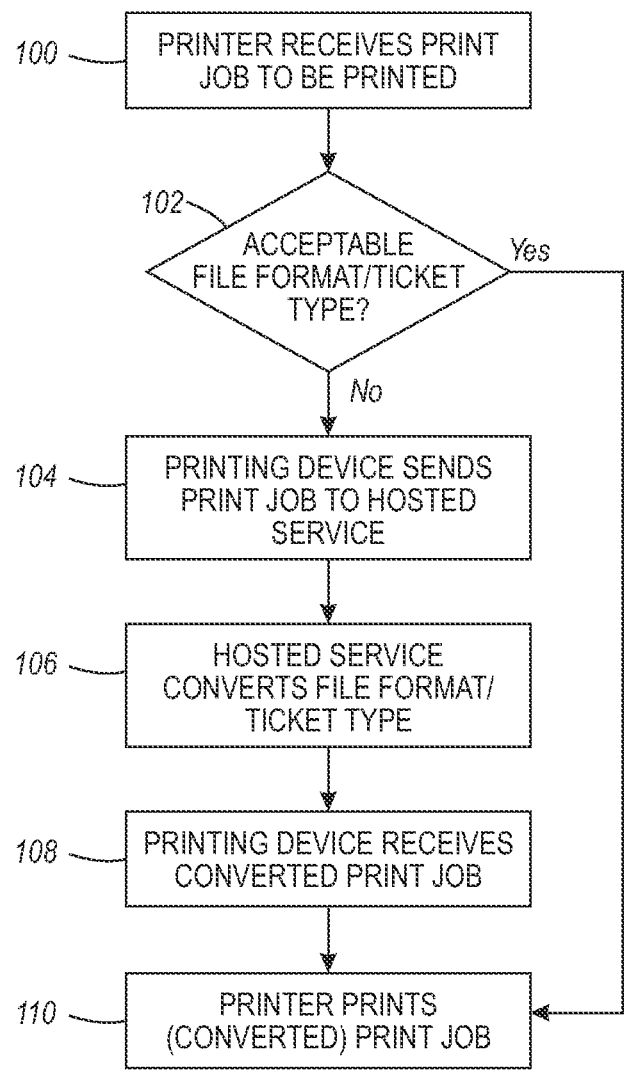
FIG. 1 is a flow diagram illustrating embodiments herein.

As shown, for example in FIG. 1, in one exemplary embodiment herein a printing device receives a print job to be printed in item 100. For example, the printing device could receive a print job conventionally from a workstation or other computerized device connected locally (either through a direct wired connection or through a local area network (that can be wired or wireless)) to the printing device. Alternatively, the print job could be received from a wide area network such as the Internet or cloud-based applications. For example, a user may operate the graphic user interface of the printing device to connect to the wide area network and select one or more documents that the user would like to be printed on the printing device. Those ordinarily skilled in the art will understand that there are many other ways in which the printing device could receive the print job and that the foregoing merely lists a limited number of examples, and that the embodiments herein are not limited to these examples.

The print job contains one of a plurality of data formats (e.g. Page Description Languages (PDLs)) and one of a plurality of ticketing types that would be generated via a print driver or custom printing application that emits print jobs. Those ordinarily skilled in the art would understand that there is practically an unlimited number of file formats currently in use by different organizations and more are being created. The embodiments herein are not limited to any specific file format type and work with all existing file formats, and will work with formats that are developed in the future.

The job ticket accompanies the electronic file document to be printed. The job ticket contains instructions as to how the document within the print job is to be handled by the printer. The job ticket may, for example, specify that one or multiple copies of one document is to be printed. Similarly, the job ticket may direct that the document within the print job be finished in some manner (bound, stapled, folded, etc.).

The ticketing commands are dependent upon different target printers and associated applications and drivers. The ticketing includes various commands based on the desired outcome for the print job and on the different hardware components and finishing devices that will be used. For example, the commands within the ticketing may be specific to certain printers and may be dependent upon potentially different raster image processors, different processors, etc., of the different printing devices. As mentioned above, there are many standards currently used for ticketing types (ticketing formats) and additional ticketing types are being developed. The embodiments herein operate well with currently existing ticketing types and can operate with all ticketing types that may be developed in the future.

In item 102, the printing device or the web service automatically compares a file format and a ticketing type of the print job with acceptable file format types and acceptable ticketing types that are acceptable to the printing device. With embodiments herein, either the printer or the web service (or a combination of the two) can determine whether the file format and/or ticketing type are correct. For example, the printer can perform the full comparison itself, or the printer can perform no comparison (can just automatically send all potential print jobs to the web service). In other embodiments, the printer can perform a preliminary comparison that is based on what device sent the print job to the printer, what device created the print job, what application or driver was used to create the print job, etc. Based on this preliminary comparison, the printer can determine whether to send the print job to the web service to have the web service perform a more complete and more sophisticated comparison to determine whether the print job contains an acceptable file format and ticketing type for the individual printer. If the file format and the ticketing type of the print job match the acceptable format types and the acceptable ticketing types in item 102, the method prints the print job using the printing device in item 110.

However, if the file format and/or the ticketing type of the print job do not match the acceptable format types and/or the acceptable ticketing types of the printer, the method performs a conversion and printing method 104-110. In this conversion and printing method, the printing device automatically sends the print job to a hosted conversion service in item 104. The hosted conversion service comprises and operates on at least one computerized device that is separate from, but operatively connected to (directly or indirectly connected to) the printing device through a computerized network. The computerized device is operatively connected to a plurality of different printing devices in addition to the printing device.

In item 106, the computerized device automatically converts the file format and/or the ticketing type of the print job into one of the acceptable format types and/or the acceptable ticketing types to produce a converted print job, which is automatically sent to the printing device.

To perform the conversion, the embodiments herein maintain a database of which document format types and which ticketing types are acceptable to the printing device that sent the print job. When converting the instructions within the document and job ticket, the embodiments translate the instructions (line by line, in groups, all simultaneously, etc.) from the original document format (language) and job ticket type (language) into instructions matching one of the document formats and job ticket types that it is acceptable to the printing device that sent the print job.

In item 108 of this conversion and printing method, the printing device receives the converted print job from the computerized device over the computerized network. In item 110, the printing device prints the converted print job.

The computerized device is a component of a generic hosted service. As is understood by those ordinarily skilled in the art, a generic hosted service can operate from a single location on a single computerized device or a generic hosted service can operate from multiple locations using multiple computerized devices. The embodiments herein can perform the print job ticket type conversion using any form of hosted service, whether presently known or developed in the future.

By performing the print job ticket type conversion using a separate computerized device, each individual printing device that can communicate with the computerized device does not need to have a sophisticated digital front end. Instead, by passing complicated processes (such as print job ticket type conversion) to a different computerized device or hosted service, the embodiments herein allow each printing device to be simplified, which reduces the costs of such printing devices and increases their flexibility.

Further, with the embodiments herein, the printing device can automatically determine (in a preliminary comparison or a full comparison) whether the print job contains a non-acceptable document type and/or non-acceptable job ticket type; and the printing device can automatically forward the non-acceptable print job to the hosted conversion service. Thus, the entire operation of the embodiments herein is transparent to the user and to any software program that may send the print job to the printing device.

Because the operation of the embodiments herein is transparent to users and software programs, printers that would otherwise be considered non-compatible can be utilized with ease. For example, some very sophisticated software programs used by large institutions may be written to produce print jobs that have specialized document formats and job tickets which can only be printed by a small number of printing devices. The administrators of such systems often face severe restrictions when they need to replace or upgrade the printing devices.

The embodiments herein address this situation by allowing practically any printing device to be used even with such specialized systems because of the automated and transparent nature of the conversion process. Further, because the conversion process is performed by a hosted service, the printing devices themselves and do not need to be altered in order to be used with such sophisticated specialized software programs. The only requirements for printing devices to utilize the embodiments herein is for such printing devices to be able to communicate with the hosted service and to be able to maintain minimal software that can evaluate whether the print job contains any non-acceptable document types and/or non-acceptable job ticket types.

Figure 2:
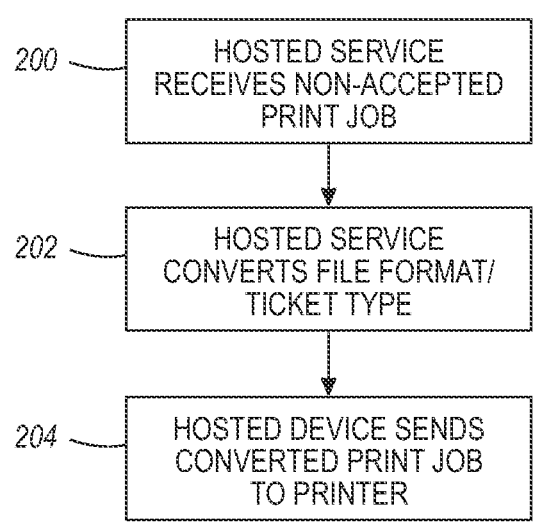
FIG. 2 is a flow diagram illustrating embodiments herein.

In another method embodiment shown in FIG. 2, the hosted service (using at least one computerized device) receives the print job from the printing device in item 200. Again, the computerized device is operatively connected to the printing device and to a plurality of different printing devices through a computerized network. Further, the print job has one of many file formats and one of many ticketing types. As explained above, in some embodiments, the printing device can indicate to the computerized device that either the file format and/or the ticketing type of the print job do not match one of many acceptable format types and acceptable ticketing types acceptable to the printing device. The print job is therefore indicated as being non-acceptable to that specific printer.

In item 202, the computerized device of the hosted service converts the file format and/or the ticketing type of the print job into one of the acceptable format types and/or the acceptable ticketing types to produce a converted print job. The computerized device sends the converted print job to the printing device over the computerized network in item 204, to allow the printing device to print the converted print job.

Figure 3:
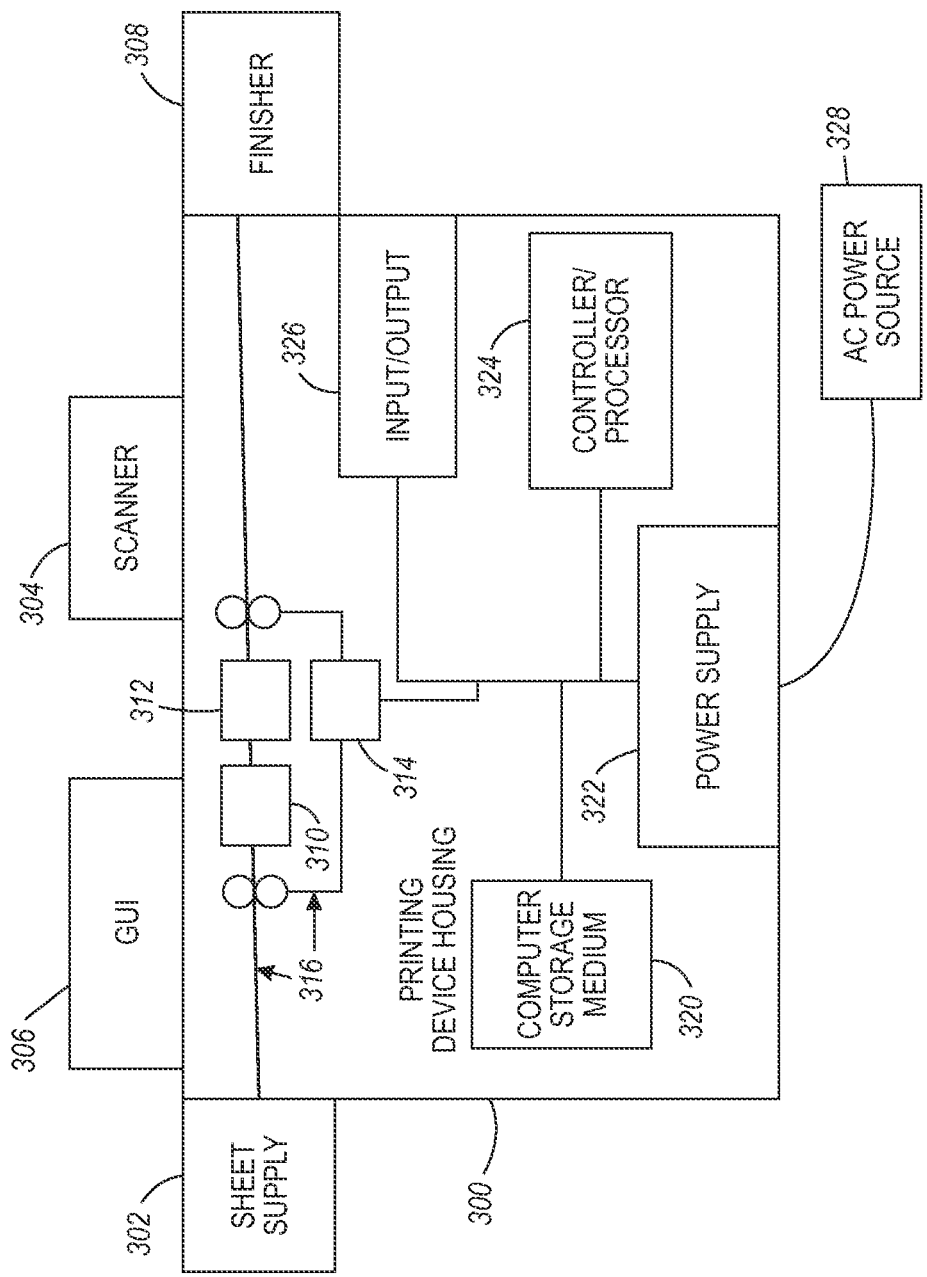
FIG. 3 is a side-view schematic diagram of a device according to embodiments herein.

A further embodiment illustrated in FIG. 3 comprises a printing device 300, which can comprise, for example, a printer, copier, multi-function machine, etc. The printing device 300 includes a controller/processor 324, at least one marking device (printing engine) 310, 312, 314 operatively connected to the processor 324, a media path 316 positioned to supply sheets of media from a sheet supply 302 to the marking device(s) 310, 312, 314, and a communications port (input/output) 326 operatively connected to the processor 324 and to a computerized network external to the printing device. After receiving various markings from the printing engine(s), the sheets of media pass to a finisher 308 which can fold, staple, sort, etc., the various printed sheets.

Further, the printing device 300 includes at least one accessory functional component (such as a scanner/document handler 304, sheet supply 302, finisher 308, etc.) and graphic user interface assembly 306 that also operate on the power supplied from the external power source 328 (through the power supply 322).

An input/output device 326 is used for communications to and from the multi-function printing device 300. The processor 324 controls the various actions of the printing device. A non-transitory computer storage medium 320 (which can be optical, magnetic, capacitor based, etc.) is readable by the processor 324 and stores instructions that the processor 324 executes to allow the multi-function printing device to perform its various functions, such as those described herein.

Thus, a printer body housing 300 has one or more functional components that operate on power supplied from the alternating current (AC) 328 by the power supply 322. The power supply 322 converts the external power into the type of power needed by the various components.

The communications port 326 receives a print job to be printed from, for example, a user's computing device that is operatively connected to the printing device 300. Again, the print job has one of many file formats and one of many ticketing types. The processor 324 or the web service compares the file format and the ticketing type of the print job with acceptable file format types and acceptable ticketing types that are acceptable to the printing device 300. If the file format and the ticketing type of the print job match the acceptable format types and the acceptable ticketing types, the processor 324 causes the print job to be printed on the sheets of media using the marking device 310, 312, 314.

However, if the file format and/or the ticketing type of the print job do not match the acceptable format types and the acceptable ticketing types, the processor 324 causes the printing device 300 to perform a conversion and printing process. In this conversion and printing process, the communications port 326 sends the print job to a computerized device operatively connected to the communications port 326 through the computerized network. Again, the computerized device is operatively connected to a plurality of different printing devices in addition to the printing device 300. The computerized device converts the file format and/or the ticketing type of the print job into one of the acceptable format types and the acceptable ticketing types to produce a converted print job. The communications port 326 receives the converted print job from the computerized device over the computerized network and the marking device(s) 310, 312, 314 print the converted print job on the sheets of media.

As would be understood by those ordinarily skilled in the art, the printing device 300 shown in FIG. 3 is only one example and the embodiments herein are equally applicable to other types of printing devices that may include less components or more components. For example, while a limited number of printing engines and paper paths are illustrated in FIG. 3, those ordinarily skilled in the art understand that many more paper paths and additional printing engines could be included within any printing device used with embodiments herein.

Figure 4:
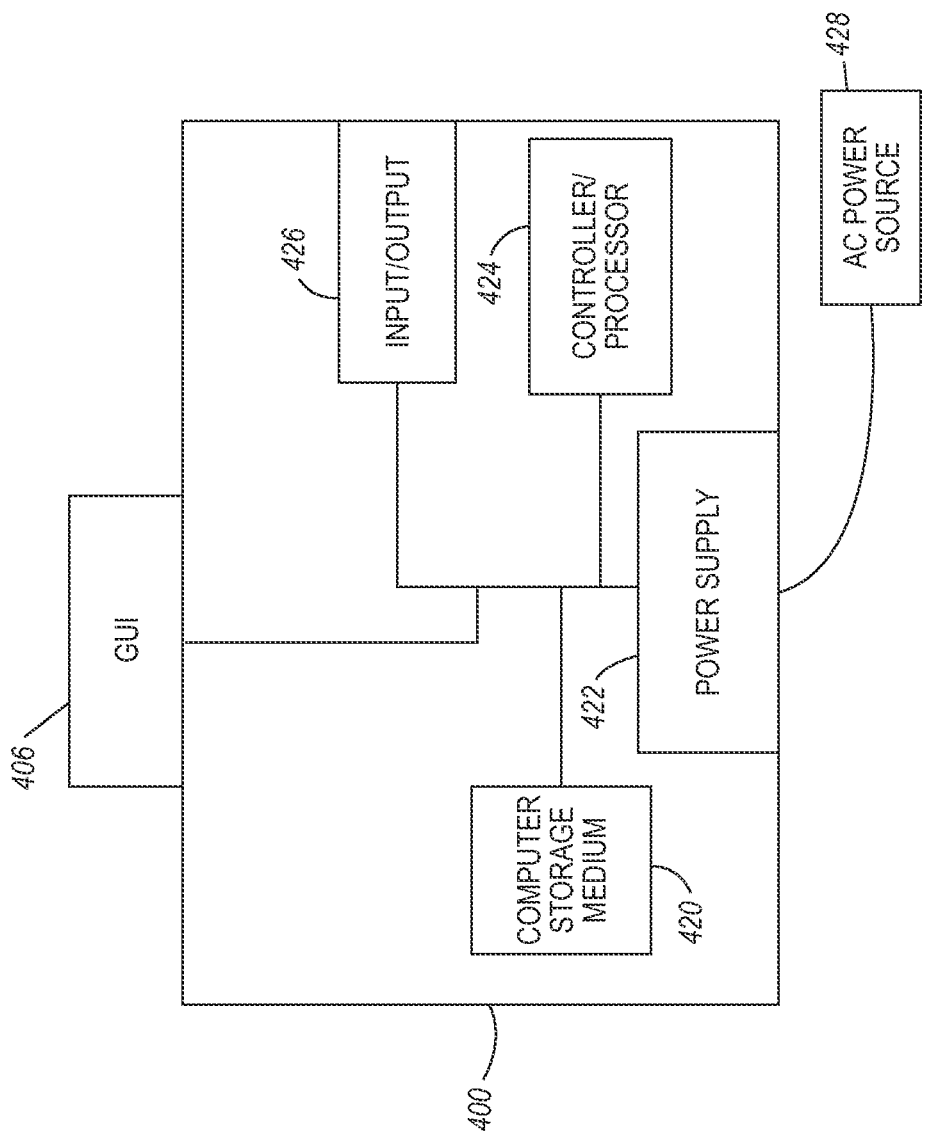
FIG. 4 is a side-view schematic diagram of a device according to embodiments herein.
Figure 5:
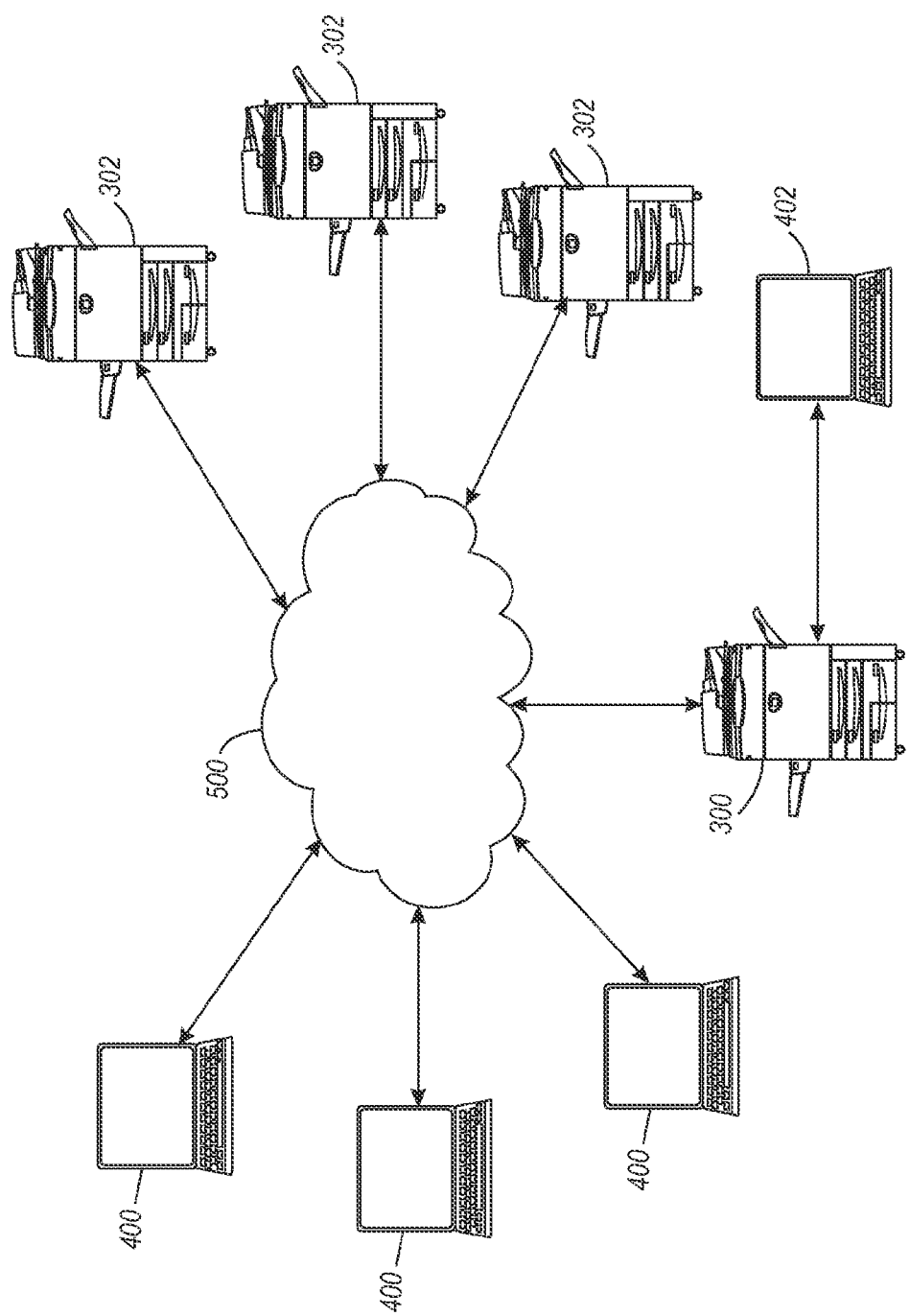
FIG. 5 is a schematic diagram of a system according to embodiments herein.

As shown in FIGS. 4 and 5, further embodiments herein comprise at least one computerized device 400 that includes a controller/processor 424, and a communications port (input/output) 426 operatively connected to the processor 424 and to a computerized network 500 external to the computerized device 400. The computerized device 400 is operatively connected to a printing device (such as printing device 300 discussed above) and to a plurality of different printing devices 302 through the computerized network. The other printing devices 302 have details similar to those shown in FIG. 3, but may use different raster image processors, different hardware and software protocols, etc.

As mentioned above, printer 300 may receive a non-acceptable print job from, for example, a user's computing device 402 that is operatively connected to the printing device 300 or the user may select a print job using the graphic user interface 306 from a hosted service within the network 500. Once the printer 300 determines that the print job is not acceptable, the communications port 426 receives the non-acceptable print job from the printing device 300. Again, the print job has one of many file formats and one of many ticketing types.

The computerized device 400 may receive the print job from the printer 300, the computerized device 402 or from another computerized device 400 that may host a document repository service. Any of these devices can perform a preliminary or complete comparison to determine whether the file format and/or the ticketing type of the print job match one of many acceptable format types and acceptable ticketing types acceptable to the printing device. If the file format and/or the ticketing type of the print job match does not one of many acceptable format types and acceptable ticketing types, the processor 424 converts the file format and/or the ticketing type of the print job into one of the acceptable format types and the acceptable ticketing types to produce a converted print job. The computerized device 400 sends the converted print job to the printing device through the communications port 426 over the computerized network 500 to allow the printing device 300 to print the converted print job.

Therefore, as shown above, the embodiments herein provide a unique use of on-printer application access for the purpose of converting a print job ticket from one format to another using a web or cloud hosted service. In some embodiments, there is no need for a computer workstation or centralized software, since all operations can be performed through the printing device user interface and web or cloud hosted services.

The embodiments herein are platform independent and therefore, regardless of the device manufacturer, the hosted application to convert job tickets described herein is a powerful tool when using non-conforming printing devices with restrictive systems.

Further, the embodiments herein allow users to perform actions at remote locations. For example, the user could be at a location where they do not have access to a workstation (and cannot connect their personal devices to a local network for security or other reasons). Because the embodiments herein can be invoked from the printing device user interface, the user can still benefit from the embodiments herein without needing to utilize a workstation.

Additionally, the embodiments herein do not require software to be installed locally because the embodiments herein are hosted in the web or cloud architecture and are accessible via the printing device user interface.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein cannot be implied or imported from any above example as limitations to any particular order, number, position, size, shape, angle, color, or material.

What is claimed is:

1. A method comprising:
    receiving, by a printing device, a print job to be printed, said print job having one of a plurality of file formats and one of a plurality of ticketing types;
    comparing a file format and a ticketing type of said print job with acceptable file format types and acceptable ticketing types acceptable to said printing device;
    if said file format and said ticketing type of said print job match at least one of said acceptable format types and at least one of said acceptable ticketing types, printing said print job using said printing device; and
    if said file format of said print job does not match any of said acceptable format types, performing an automatic conversion and printing method,
    if said ticketing type of said print job does not match any of said acceptable ticketing types, performing said automatic conversion and printing method,
    said automatic conversion and printing method comprising:
        sending, by said printing device, said print job to a computerized device operatively connected to said printing device through a computerized network, said computerized device being operatively connected to a plurality of different printing devices in addition to said printing device, said computerized device automatically converting said file format of said print job into one of said acceptable format types to produce a converted print job if said file format of said print job does not match any of said acceptable format types, and said computerized device automatically converting said ticketing type of said print job into one of said acceptable ticketing types to produce said converted print job if said ticketing type of said print job does not match any of said acceptable ticketing types,
        receiving, by said printing device, said converted print job from said computerized device over said computerized network; and
        printing, by said printing device, said converted print job.

2. The method according to claim 1, said file formats being dependent upon a software program used to create a document within said print job.

3. The method according to claim 1, said ticketing types being dependent upon different hardware components and different software requirements of said different printing devices.

4. The method according to claim 1, said ticketing types being dependent upon different raster image processors and different processors of said different printing devices.

5. The method according to claim 1, said computerized device comprising a component of a generic hosted service.

6. A method comprising:
    receiving, by a computerized device, a print job from a printing device, said computerized device being operatively connected to said printing device and to a plurality of different printing devices through a computerized network, said print job having one of a plurality of file formats and one of a plurality of ticketing types, at least one of a file format and a ticketing type of said print job do not match one of many acceptable format types and acceptable ticketing types acceptable to said printing device;
    automatically converting, by said computerized device, said file format of said print job into one of said acceptable format types to produce a converted print job if said file format does not match any of said acceptable format types;
    automatically converting, by said computerized device, said ticketing type of said print job into one of said acceptable ticketing types to produce said converted print job if said ticketing type does not match any of said acceptable ticketing types; and
    sending, by said computerized device, said converted print job to said printing device over said computerized network to allow said printing device to print said converted print job.

7. The method according to claim 6, said file formats being dependent upon a software program used to create a document within said print job.

8. The method according to claim 6, said ticketing types being dependent upon different hardware components and different software requirements of said different printing devices.

9. The method according to claim 6, said ticketing types being dependent upon different raster image processors and different processors of said different printing devices.

10. The method according to claim 6, said computerized device comprising a component of a generic hosted service.

11. A printing device comprising:

a processor;

a marking device operatively connected to said processor;

a media path positioned to supply sheets of media to said marking device; and a communications port operatively connected to said processor and to a computerized network external to said printing device, said communications port receiving a print job to be printed, said print job having one of a plurality of file formats and one of a plurality of ticketing types;

if a file format and a ticketing type of said print job match at least one of many acceptable format types and at least one of many acceptable ticketing types, said processor causes said print job to be printed on said sheets of media using said marking device; and if said file format of said print job does not match at least one of said acceptable format types, said processor causes said printing device to perform an automatic conversion and printing process, if said ticketing type of said print job does not match at least one of said acceptable ticketing types, said processor causes said printing device to perform said automatic conversion and printing process, said automatic conversion and printing process comprising:

sending, by said communications port, said print job to a computerized device operatively connected to said communications port through said computerized network, said computerized device being operatively connected to a plurality of different printing devices in addition to said printing device, said computerized device automatically converting said file format of said print job into one of said acceptable format types to produce a converted print job if said file format of said print job does not match any of said acceptable format types, and said computerized device automatically converting said ticketing type of said print job into one of said acceptable ticketing types to produce said converted print job if said ticketing type of said print job does not match any of said acceptable ticketing types, receiving, by said communications port, said converted print job from said computerized device over said computerized network; and printing, by said marking device, said converted print job on said sheets of media.

12. The printing device according to claim 11, said file formats being dependent upon a software program used to create a document within said print job.

13. The printing device according to claim 11, said ticketing types being dependent upon different hardware components and different software requirements of said different printing devices.

14. The printing device according to claim 11, said ticketing types being dependent upon different raster image processors and different processors of said different printing devices.

15. The printing device according to claim 11, said computerized device comprising a component of a generic hosted service.

16. A computerized device comprising:

a processor; and a communications port operatively connected to said processor and to a computerized network external to said computerized device, said computerized device being operatively connected to a printing device and to a plurality of different printing devices through said computerized network, said communications port receiving a print job from said printing device, said print job having one of a plurality of file formats and one of a plurality of ticketing types, at least one of a file format and a ticketing type of said print job do not match one of many acceptable format types and acceptable ticketing types acceptable to said printing device, said processor automatically converting said file format of said print job into one of said acceptable format types to produce a converted print job if said file format does not match any of said acceptable format types, said processor automatically converting said ticketing type of said print job into one of said acceptable ticketing types to produce said converted print job if said ticketing type does not match any of said acceptable ticketing types; and said communications port sending said converted print job to said printing device over said computerized network to allow said printing device to print said converted print job.

17. The computerized device according to claim 16, said file formats being dependent upon a software program used to create a document within said print job.

18. The computerized device according to claim 16, said ticketing types being dependent upon different hardware components and different software requirements of different computerized devices.

19. The computerized device according to claim 16, said ticketing types being dependent upon different raster image processors and different processors of said different printing devices.

20. The computerized device according to claim 16, said computerized device comprising a component of a generic hosted service.

* * * * *